May 25, 1926.
W. G. TWYMAN
LUBRICATING SYSTEM
Filed Oct. 20, 1925
1,585,742
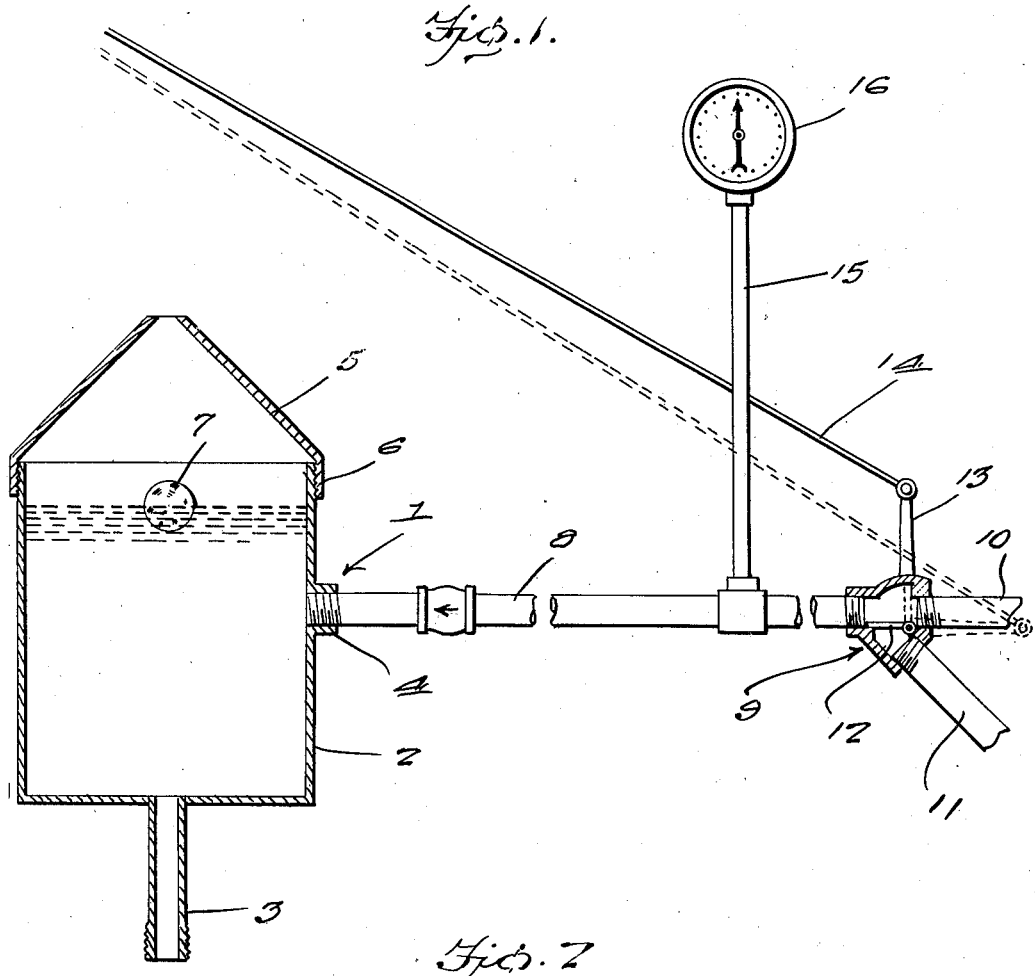
Fig. 1.
Fig. 2.
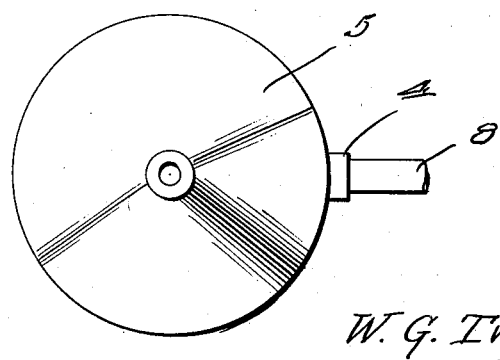
Inventor
W. G. Twyman Patented May 25, 1926.

1,585,742

UNITED STATES PATENT OFFICE.

WILLIAM G. TWYMAN, OF POTEAU, OKLAHOMA.

LUBRICATING SYSTEM.

Application filed October 20, 1925. Serial No. 63,651.

This invention relates to an improved lubricating system which is especially, although not necessarily, designed for use in association with automobiles and other similar machinery.

My principal aim is to generally improve upon inventions of this kind by providing one of comparative simplicity embodying novel details arranged in a manner to produce an exceedingly efficient and practical structure adapted to accomplish the end sought in an efficient manner.

The outstanding features and advantages of the invention will become apparent from the following description and drawing.

In the accompanying drawing forming a part of this application and in which like numerals are employed to designate like parts throughout the same:—

Figure 1 is a view in section and elevation showing a portion of the system.

Fig. 2 is a top plan view of one of the oil cups forming an important detail of the improvement.

Referring to the drawing in detail, the reference character 1 designates the oil cup generally. It comprises a receptacle 2 having a discharge pipe 3 at the center of its bottom, which is screw threaded at its free end to permit it to be tapped into a screw hole in a bearing or other part to be lubricated. On one side and between the top and bottom, the receptacle is formed with an internally screw threaded neck 4. It is also screw threaded at its top and a truncated conical cover 5 is connected thereto, the cover being formed with a peripheral flange 6 screwed onto the receptacle as shown.

By truncating the apex of the cover, an air vent is provided and the under side of the cover forms a valve seat for a float valve 7. This float valve 17 is spherical in shape and is of some material lighter than oil and is adapted to be raised by the level of the oil to close the vent.

Connected to the nipple or neck 4 is a supply pipe 8 of either flexible or stiff tubing or combination of both, which is in turn connected to the casing of a three-way valve 9. A supply pipe 10 is also connected to the valve casing and a drain pipe 11 is further connected therewith. The other end of pipe 11 is connected with the crank case or other source of supply (not shown). The valve 12 is preferably in the form of a flap which is mechanically controlled by an external operating arm 13 in turn operated by a push and pull rod 14. This rod will extend through the instrument board on the machine within convenient reach of the operator. It is yet to be pointed out that a pipe 15 is connected with either the pipe 8 or pipe 10, and is provided at its upper end with a gauge 16 by means of which the pressure in the line may be ascertained.

It is contemplated that the so-called supply pipe 10 will be connected with the automobile crank case and the customary pump utilized for forcing the oil under pressure through the pipes 10 and 8 and into the oil cups. The means of supplying the oil under pressure into these lines, however, may be of any desirable form.

The primary feature of the invention is deemed to be the oil cup with its cone-shaped cap, the spherical shaped floating valve and the location of the inlets and outlets, wherein the inlet is essentially larger than the outlet. An equally important feature, however is derived from the use of the common three-way valve in the system. It is clear from the showing that one pipe line connects to this valve from the source of supply and when the valve is properly set or open, it allows the oil to be forced directly from the crank case, or other source of supply into the lines of the oiling system and down into the first oil cup in the line. As the oil comes into this cup, the air passes out of the top of the cup through the small opening until the float is raised, with the level of the oil, to close the opening. The cup is then full and no more can enter and the oil in the system will be forced to the next cup which will be filled as above stated, and this will continue until all of the cups in the system are filled, after which a back pressure will accumulate in the system and will be accurately registered upon the gauge.

The outstanding point of the whole system is that the valve in the cup remains closed by the pressure of the oil until all of the cups in the entire system are filled and the back pressure is built up to be indicated accurately upon the gauge. Then the pressure may be turned off and the oil will merely feed to the bearings out of the cups by gravity feed and capillary attraction as it would from the ordinary oil cup.

When the desired back pressure is built up in the system, as indicated on the pressure gauge, the setting of the three-way valve is changed so as to close the line 10, thereby opening the line 11, allowing the oil in line 8 and in the cups above opening 4, to siphon back into the crank case, thus freeing the feed lines of oil until the operation is to be repeated.

When the means adapted to supply the oil are such that it would be advantageous to use check valves in the supply lines, same will be introduced into the system at such point or points as will be most beneficial.

It is believed that a consideration of the description in connection with the drawings will enable persons skilled in the art to which the invention relates to obtain a clear understanding of the same. Therefore, a more lengthy description is thought unnecessary.

While the preferred embodiment of the invention has been shown and described, it is to be understood that minor changes coming within the field of invention claimed may be resorted to if desired.

Having thus described my invention, what I claim as new is:—

1. In a lubricating system, in combination, an oil cup having an air vent at its top and a discharge pipe at its bottom, a float valve therein adapted to coact with said air vent, a supply pipe connected to one side of the cup, a three-way valve casing, said supply pipe being connected to one branch of said casing, a second supply pipe connected to said casing, and adapted to be connected to a source of supply, a drain pipe also connected to said casing, a single valve in said casing for controlling all of said pipes, control means for said valve, and a gauge connected with one of said supply pipes.

2. In a lubricating system of the kind described, an oil cup comprising a receptacle which is open at its top and provided in its side between its top and bottom with a supply pipe connecting nipple and provided at its bottom with a discharge pipe, a truncated conical cover connected to the receptacle and closing said open top, the truncated end of said cover forming an air vent and the inner surface adjacent the vent forming a valve seat, and a float valve in said cup adapted for cooperation with said seat.

In testimony whereof I affix my signature.

WILLIAM G. TWYMAN